(12) United States Patent
Bannon et al.

(10) Patent No.: US 8,285,937 B2
(45) Date of Patent: Oct. 9, 2012

(54) FUSED STORE EXCLUSIVE/MEMORY BARRIER OPERATION

(75) Inventors: Peter J. Bannon, Concord, MA (US); Po-Yung Chang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 401 days.

(21) Appl. No.: 12/711,941

(22) Filed: Feb. 24, 2010

(65) Prior Publication Data
US 2011/0208915 A1    Aug. 25, 2011

(51) Int. Cl.
*G06F 12/00*    (2006.01)
*G06F 12/08*    (2006.01)

(52) U.S. Cl. ............... 711/122; 711/125; 711/E12.001; 711/E12.002; 711/E12.024

(58) Field of Classification Search .................. 711/122, 711/125, E12.001, E12.002, E12.024
See application file for complete search history.

(56) References Cited

U.S. PATENT DOCUMENTS

| | | | |
|---|---|---|---|
| 6,298,436 B1 | 10/2001 | Kahle et al. | |
| 6,725,340 B1 * | 4/2004 | Guthrie et al. | 711/141 |
| 6,748,501 B2 | 6/2004 | Arimilli et al. | |
| 7,500,045 B2 | 3/2009 | Hofmann et al. | |
| 7,689,813 B2 | 3/2010 | Caprioli et al. | |
| 7,783,817 B2 | 8/2010 | Sullivan, Jr. et al. | |
| 2011/0078692 A1 * | 3/2011 | Nickolls et al. | 718/103 |

* cited by examiner

*Primary Examiner* — Yong Choe
(74) *Attorney, Agent, or Firm* — Lawrence J. Merkel; Meyertons, Hood, Kivlin, Kowert & Goetzel, P.C.

(57) ABSTRACT

In an embodiment, a processor may be configured to detect a store exclusive operation followed by a memory barrier operation in a speculative instruction stream being executed by the processor. The processor may fuse the store exclusive operation and the memory barrier operation, creating a fused operation. The fused operation may be transmitted and globally ordered, and the processor may complete both the store exclusive operation and the memory barrier operation in response to the fused operation. As the fused operation progresses through the processor and one or more other components (e.g. caches in the cache hierarchy) to the ordering point in the system, the fused operation may push previous memory operations to effect the memory barrier operation. In some embodiments, the latency for completing the store exclusive operation and the subsequent data memory barrier operation may be reduced if the store exclusive operation is successful at the ordering point.

25 Claims, 7 Drawing Sheets

FUSED STORE EXCLUSIVE/MEMORY BARRIER OPERATION

BACKGROUND

1. Field of the Invention

This invention is related to the field of processors and, more particularly, to store exclusive and memory barrier handling in processors.

2. Description of the Related Art

Certain regions of software code, referred to as "critical regions," require controlled entry and exit. For example, in multiprocessor and/or multithreaded environments, one or more independent code sequences can access a shared data structure. The code that performs the accesses can be a critical region. If more than one processor/thread executes the critical region concurrently, the results of the execution may not be predictable and/or may not be as expected.

One mechanism for controlling access to the critical region of code is a spin lock on a memory location. Any code desiring to execute the critical section reads the memory location, checks its current value, and conditionally writes a value back. The value in the memory location indicates the status of the critical region (e.g. available or in use). If the value read by a given processor/thread indicates available, that processor/thread can write back a value indicating in use. For example, zero can indicate available and a non-zero value can indicate in use. In some cases, the non-zero value can carry additional information (e.g. identifying the processor or thread that is using the critical section). To operate properly, the read and the corresponding write by a processor/thread is performed atomically (i.e. one processor successfully writes to the location to indicate in use, and other processors are prevented from writing the location even if the other processors read the available value). In this fashion, only one processor/thread can detect that the memory location indicates available and successfully enter the critical region, even if the reads and writes from multiple processors/thread overlap in time.

Some processors implement load exclusive and store exclusive instructions to support atomic access. The load exclusive instruction causes monitoring hardware to begin monitoring an address accessed by the load exclusive instruction. If the corresponding store exclusive occurs prior to interference by another processor/thread, the store exclusive completes successfully and the processor/thread that completes the store exclusive can execute the critical section. Other processors/threads detect that the store exclusive occurred, and their own store exclusive instructions fail, causing the spin lock loop to be reexecuted in those processors/threads for example.

To ensure that memory accesses within the critical section do not occur out of order with acquiring access to the critical section, the spin lock loop can complete with a data memory barrier instruction. The data memory barrier is defined to cause all previous accesses to become globally visible prior to completion of the data memory barrier. The data memory barrier also prevents subsequent memory operations from being performed until the data memory barrier is complete.

The spin lock loops using load exclusive, store exclusive, and data memory barrier instructions provide correct operation of the spin lock loops. However, the performance of the processors (e.g. in terms of average number of instructions executed per clock cycle) tends to degrade because the operations are long latency operations and they are also synchronizing. Since spin locks are frequently executed, the effect on performance may be significant. The load exclusive, store exclusive, and data memory barrier instructions can be used in other program sequences besides spin locks as well.

SUMMARY

In an embodiment, a processor may be configured to detect a store exclusive operation followed by a data memory barrier operation in a speculative instruction stream being executed by the processor. The processor may fuse the store exclusive operation and the data memory barrier operation, creating a fused operation. The fused operation may be transmitted and globally ordered, and the processor may complete both the store exclusive operation and the memory barrier operation in response to the fused operation. As the fused operation progresses through the processor and one or more other components (e.g. caches in the cache hierarchy) to the ordering point in the system, the fused operation may push previous memory operations to effect the memory barrier operation. In some embodiments, the latency for completing the store exclusive operation and the subsequent data memory barrier operation may be reduced if the store exclusive operation is successful when it reaches the ordering point.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits that implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
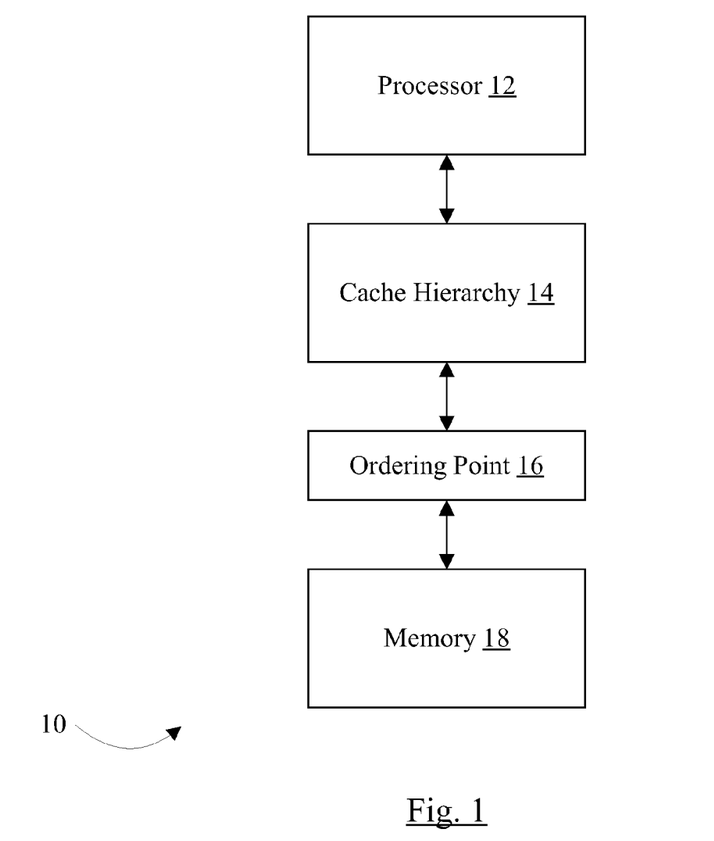
FIG. 1 is a block diagram of one embodiment of system including a processor, a cache hierarchy, a system ordering point, and a memory.

Turning now to FIG. 1, a block diagram of one embodiment of a system 10 is illustrated. In the embodiment of FIG. 1, the system 10 includes a processor 12, a cache hierarchy 14, an ordering point 16, and a memory 18. The processor 12 is coupled to the cache hierarchy 14, which is coupled to the ordering point 16. The memory 18 is also coupled to the ordering point 16, and may serve as the system memory for the system 10.

The processor 12 may be configured to execute instructions defined in a variety of instruction set architectures. More particularly, the processor 12 may be configured to execute instructions from an instruction set architecture that includes load exclusive and store exclusive instructions, and a memory barrier instruction.

In one embodiment, the processor 12 may be configured to detect a store exclusive memory operation followed by a data memory barrier operation. The processor 12 may be configured to issue one combined operation in response to the store exclusive operation and the data memory barrier operation. The combined operation may be transmitted through the processor 12 and down the cache hierarchy 14 to the ordering point 16. Once the combined operation is ordered at the ordering point 16, the lowest cache in the cache hierarchy 14 may be configured to return an indication of the successful ordering. The processor 12 may be configured to associate the indication with the store exclusive operation and the data memory barrier operation. Accordingly, the latency of traveling to the ordering point 16 and back may be incurred once for the combined operation. The latency may thus be less than if the store exclusive were transmitted to the ordering point 16, and subsequently the data memory barrier operation were transmitted.

Since the combined operation includes the data memory barrier operation, the combined operation may push the memory operations transmitted prior to the data memory barrier operation to the ordering point 16. Pushing the prior operations may include ensuring that the prior operations are completed or continue down the cache hierarchy prior to the memory barrier operation. Pushing may not include increasing the priority of the operations, in some embodiments, but may simply include inhibiting further processing of the memory barrier operation until the prior operations have been completed or transmitted to the next level of hierarchy. Priority may be increased in other embodiments, as desired. In an embodiment, each operation may be ordered on the ordering point 16 or may be completed in the processor 12/cache hierarchy 14 if cache coherence mechanisms permit. For example, a valid copy of the data accessed by a load anywhere in the cache hierarchy 14 may permit the load to complete at that point. An exclusive or modified copy of the block written by a store memory operation may permit the store to complete by updating the cached copy.

The combined operation may be one transmission on the interfaces between the processor 12 and the caches in the cache hierarchy 14, and one operation ordered at the ordering point 16. That is, there may be a single operation transmitted to the ordering point 16 that orders both the store exclusive operation and the data memory barrier operation.

In one embodiment, the combined operation (also referred to as a "fused operation" herein) may be speculative. If the store exclusive operation does not complete successfully (e.g. the reservation is no longer valid at the time the store exclusive operation reaches the ordering point 16), the data memory barrier operation may be flushed (e.g. it may be subsequent to the compare and branch that tests the result of the store exclusive operation, as discussed below). Thus, the data memory barrier instruction may be executed again after a later iteration of the load exclusive/store exclusive loop.

As mentioned previously, the load exclusive instruction may enable monitoring by the processor of the block accessed by the load exclusive. The size of the block may vary in various implementations. For example, the size may be the size of a cache block. The size may be the size of a block over which coherency is maintained (also known as the "coherence granule"). Any size block may be used in various embodiments. Initiating the monitoring for the block may be referred to as reserving the block, or establishing a reservation for the block. Generally, the monitor may detect access to the block that may interfere with atomic update of the block using the load exclusive and store exclusive instructions. In some cases, any access to the block may be detected. Other embodiments may detect accesses that permit the accessing entity to update the block (e.g. an exclusive read access, a write access, or an invalidating probe). The store exclusive instruction may be a conditional store. That is, if the monitor has not detected other accesses to the monitored block that interfere with the atomic access (e.g. the reservation is still valid), the store exclusive may complete successfully. If the monitor has detect interfering accesses, the store exclusive may fail. The memory location targeted by the store exclusive may not be updated when the store exclusive fails. In an embodiment, the store exclusive instruction may specify a target register to update with a result of the store exclusive (e.g. a general purpose register, a condition register, etc.). The result may be tested (e.g. with a compare and branch instruction or instruction sequence) to determine if the store exclusive was successful or not. Load exclusive instructions may also be referred to as load and reserve or load with reservation instructions in some instruction set architectures. Store exclusive instructions may also be referred to as conditional store instructions in some instruction set architectures.

The processor 12 may be configured to execute the load and store exclusive instructions, and may be configured to generate corresponding load and store exclusive memory operations. Generally, a memory operation may be an operation to access a memory location that is derived from an instruction. In some embodiments, the instructions may be explicit load and store instructions. In other embodiments, the instructions may be other types of instructions (e.g. arithmetic/logic instructions) that specify a memory operand and thus the load/store memory operation may be implicit in the instruction. Load and store memory operations may be more succinctly referred to as load and store operations, or even more succinctly as loads and stores.

The data memory barrier instruction may ensure that all memory operations corresponding to instructions prior to the memory barrier instruction are globally visible prior to initiating memory operations subsequent to the memory barrier instruction. For example, the prior memory operations may have reached the ordering point in the system and may have been successfully ordered at the ordering point to be globally visible. Alternatively, prior memory operations may become globally visibly via coherently committing to a cache (store) or coherently reading from a cache (load). Generally, a memory operation may be globally visible if its effect on targeted locations will be detected from any observer point in the system (e.g. another processor, a coherent input/output device, etc.). The processor 12 may be configured to execute the data memory barrier instruction and generate a data memory barrier operation. The data memory barrier operation may be transmitted from the processor to the ordering point 16 of the system, and may ensure that the memory operations prior to the data memory barrier operation are globally visible. The data memory barrier operation may then complete, and may permit subsequent memory operations to be performed.

In various embodiments, one or more caches may form a cache hierarchy 14 between the processor 12 and the ordering point 16. Caches in the hierarchy may be accessed in parallel and/or in series in response to memory operations in the processor 12. In some embodiments, the cache hierarchy 14 may include a level one (L1) cache that is incorporated within the processor 12 itself, a level 2 (L2) cache that is accessed if a memory operation misses in the L1 cache, etc. Thus, caches may be viewed as closer to the processor (accessed first in response to a memory operation) or farther away from the processor (accessed subsequently). Caches that are closer to the processor may be referred to as being higher in the cache hierarchy 14 than the caches that are farther from the processor. Similarly, caches that are farther from the processor may be viewed as lower in the cache hierarchy 14. Caches that are lower in the cache hierarchy may also be accessed by other caches and/or other processors (not shown in FIG. 1), in various embodiments. Other embodiments may include only a single level of cache in the hierarchy 14 (the L1 DCache, for example), or there may be no caches and the processor 12 may be directly coupled to the ordering point 16.

The lowest cache in the cache hierarchy 14 may be coupled to the ordering point 16, and may be configured to manage the memory operations from the higher level caches and/or processors for transmission and ordering at the ordering point 16. The ordering point 16 may be any part of the system 10 at which the order of memory operations from different sources are ordered for the system (or "globally ordered"). That is, memory operations from different sources, such as different processors and/or processors and input/output devices, may not have any express ordering between them. Similarly, loads and stores from the same source to different memory locations may or may not have a specified order in some memory models (e.g. weakly ordered memory models). The global order established at the ordering point may define the order of such memory operations during execution. Thus, if a load is ordered after a store, the data written to the memory 18 in response to the store is reflected in the data returned for that load. Similarly, a load ordered prior to a store receives data that does not reflect the data written to memory in response to the store. The order of two stores to the same memory location indicates which data will reside in the memory location after the two stores are completed (i.e. the data of the subsequent store in the global order).

The ordering point 16 may take a variety of forms in various embodiments. For example, the ordering point 16 may be an interface in a system. The ordering point 16 may be a memory controller that couples to the memory 18. The ordering point 16 may be centralized (e.g. a bus interface) or distributed (e.g. multiple memory controllers coupled to a distributed memory system, or a packet interface using point to point links between components of the system).

The memory 18 may comprise any semiconductor memory devices. For example, various forms of dynamic random access memory (DRAM) such as synchronous DRAM (SDRAM), double data rate (DDR, DDR2, DDR3, DDR4, etc.) SDRAM, RAMBUS DRAM, etc. may be used. Static RAM (SRAM) may be used, or any other form of memory. Low power (e.g. LPDDR2) SDRAM may be used, in some embodiments.

The processor 12 may include any circuitry that implements processor functionality. In some embodiments, the processor 12 may be a discrete integrated circuit component. In other embodiments, the processor 12 may be a core implemented on an integrated circuit with one or more other components (e.g. caches in the cache hierarchy 14, one or more memory controllers, I/O devices and/or interfaces to external I/O devices, etc.). In still other embodiments, the processor 12 and/or one or more other components may be part of a multichip module, chip-on-chip package, or package-on-package implementation with other integrated circuits implementing other components.

Figure 2:
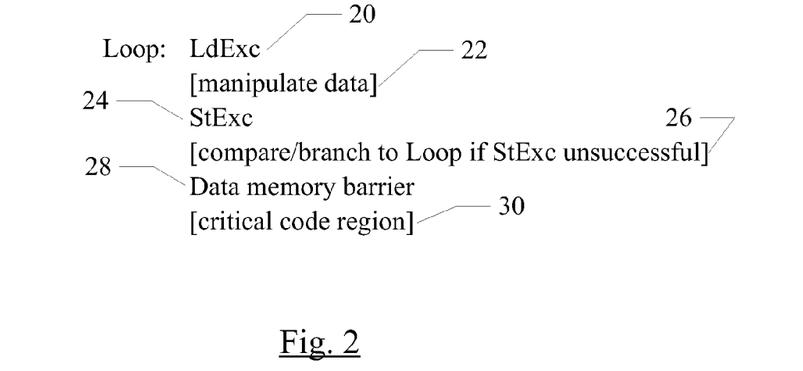
FIG. 2 is a code sequence illustrating one embodiment of a spin lock loop.

Turning next to FIG. 2, a code sequence illustrating one embodiment of the use of the load exclusive (LdExc), store exclusive (StExc), and data memory barrier instructions in a spin lock code sequence is shown. Other code sequences may be used, and the LdExc, StExc, and data memory barrier instructions may be used for other purposes. Other orders of the instructions may be used as well.

The LdExc instruction may be executed first, loading the lock value from the memory location (reference numeral 20). In addition, the processor 12 may establish a reservation for the block from which the lock value was loaded. In some embodiments, the LdExc may also be transmitted to the ordering point 16, and may establish a reservation in one or more other exclusivity monitors along the way (e.g. at the lowest cache in the cache hierarchy 14). One or more non-load/store instructions may be used to manipulate the lock data (reference numeral 22). For example, the lock value may be incremented, or a value identifying the processor or thread may be generated. The current value may be tested to determine if it indicates available, in some cases. The sequence includes a store exclusive instruction (reference numeral 24) to conditionally write the store data to the block. One or more instructions may compare the result to an indication of success (or failure), and may branch to the Loop label (e.g. the LdExc instruction) if the StExc instruction is unsuccessful, to attempt the loop again (reference numeral 26). The code sequence may include the data memory barrier instruction (reference numeral 28), and instructions forming the critical code region protected by the spin lock (reference numeral 30).

The data memory barrier operation corresponding to the data memory barrier instruction 28 may be fused with the store exclusive operation corresponding to the StExc instruction 24 to form the combined operation. Accordingly, as can be seen in FIG. 2, the data memory barrier instruction need not be immediately subsequent to the StExc instruction to be fused. For example, one or more non-load/store instructions may be between the StExc instruction 24 and the data memory barrier instruction 28. Thus, an memory barrier instruction may follow a StExc instruction if it is the next sequential instruction, or if one or more non-load/store instructions are between the StExc instruction and the memory barrier instruction, or if the memory barrier instruction is within a certain number of instructions of the StExc instruction, etc. Similarly, a memory barrier operation in the processor 12 may follow a store exclusive operation by a certain number of clock cycles, or by being in adjacent or nearly adjacent entries in a load/store queue, etc.

Since there is a branch in between the StExc instruction 24 and the data memory barrier instruction 28, the data memory barrier instruction 28 may follow the StExc instruction 24 in a speculative instruction stream executed by the processor 12, in an embodiment. That is, the processor 12 may predict the branch instruction not taken and provide the data memory barrier instruction for speculative execution. If the branch is taken (that is, the StExc instruction fails), the data memory barrier may be incorrectly executed and may be flushed. In this case, however, the issuance of the memory barrier fused with the store exclusive operation may not improperly impact the architected state of the processor 12 or the system. Accordingly, there is no harm to the correct operation of the system for speculatively transmitting the memory barrier operation.

While the examples described herein may fuse the data memory barrier operation with a preceding store exclusive operation, other embodiments may fuse the data memory barrier operation with other preceding memory operations (e.g. non-StExc operations, load operations, etc.).

Figure 3:
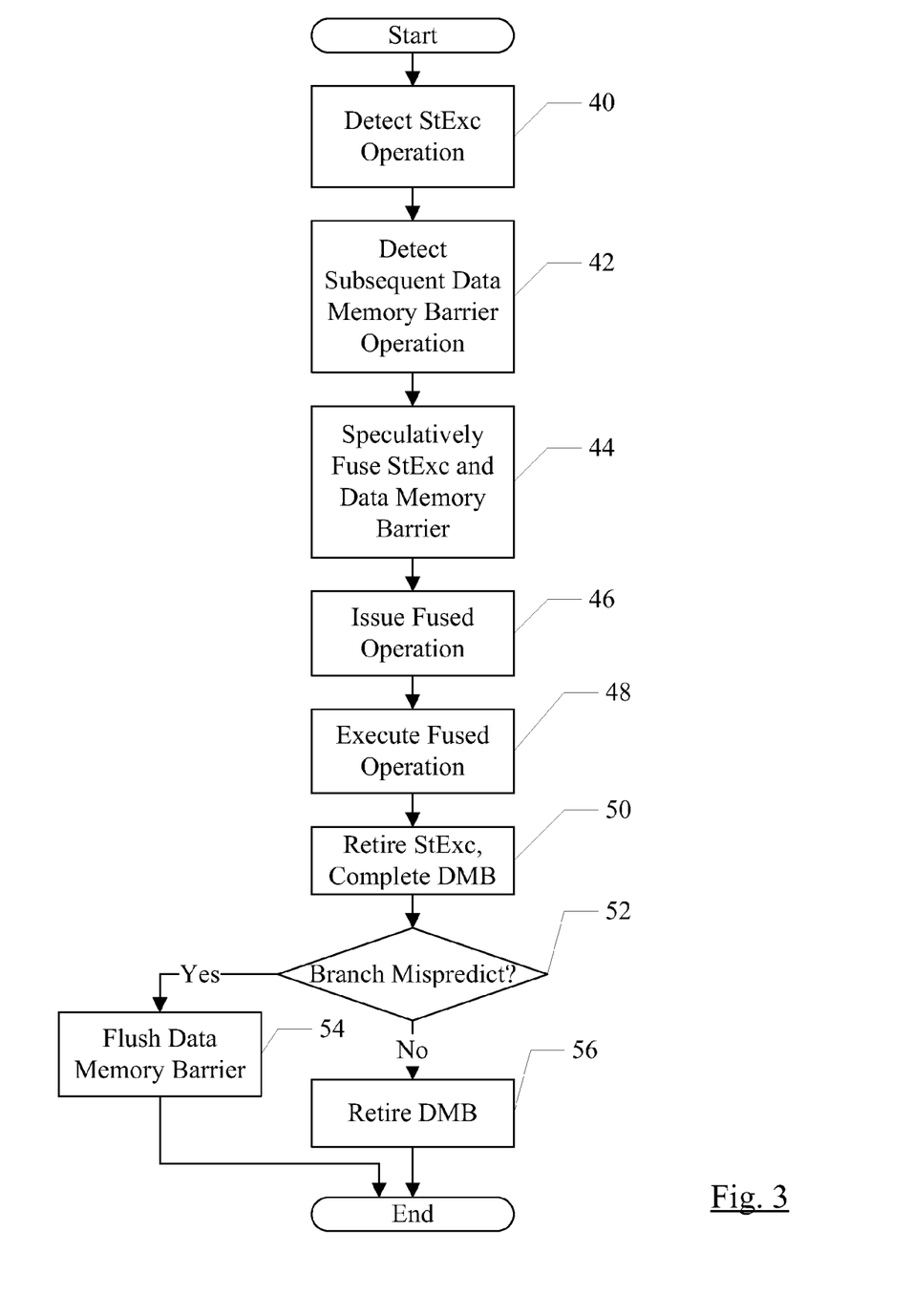
FIG. 3 is a flowchart illustrating one embodiment of a fused store exclusive (StExc) and data memory barrier (DMB) operation.

Turning now to FIG. 3, a flowchart is shown illustrating operation of one embodiment of the system 10 at a high level to perform the fused store exclusive/data memory barrier operation. While the blocks are shown in a particular order for ease of understanding, other orders may be used. Blocks may be performed in parallel in combinatorial logic within the system 10. Blocks, combinations of blocks, and/or the flowchart as a whole may be pipelined over multiple clock cycles.

A store exclusive operation may be detected in the system 10 (block 40). Depending on the location in the system 10 at which the detection occurs, the store exclusive operation may be detected by detecting the store exclusive instruction or by detecting the operation itself. For example, an embodiment discussed in more detail below detects the operation in the load/store unit of the processor. Other embodiments may detect the store exclusive operation at a scheduling stage prior to entry into the load/store unit, or at a later stage such as in a request buffer queuing requests to be transmitted from the processor 12 to an external cache or directly to the ordering point 16, for example.

The system 10 may be configured to detect the subsequent data memory barrier operation (block 42). Similar to the above discussion, the system 10 may be configured to detect the data memory barrier operation at various points in the processing of the data memory barrier instruction. Specifically, the detection of the data memory barrier operation may occur at the same point the system as the detection of the store exclusive operation, in some embodiments.

The system 10 may be configured to speculatively fuse the store exclusive operation and the data memory barrier operation, generating one combined operation (block 44). The fusing may be speculative if the instruction stream including the store exclusive instruction and the data memory barrier instruction is speculative, or if either instruction is speculative. For example, in FIG. 2, in some cases the data memory barrier instruction may be speculative since it is subsequent to a predicted branch instruction, even if the store exclusive instruction is non-speculative. In other cases, the fusing may be non-speculative (e.g. if both instructions are non-speculative).

The processor 12 may be configured to issue the fused operation, and the cache hierarchy 14 may propagate the fused operation to the ordering point 16 (block 46). As the fused operation propagates, the operation of the data memory barrier may be implemented, pushing preceding memory operations to global ordering prior to the fused operation. At the ordering point 16, the system 10 may be configured to determine if the store exclusive operation succeeds. That is, the system 10 may be configured to determine if an intervening, interfering memory operation to the block associated with the store exclusive operation has occurred. If not, the store exclusive operation may succeed. Otherwise, the store exclusive operation may fail. The data memory barrier operation may also be transmitted on the ordering point 16, in some embodiments. Thus, the fused operation may be viewed as executed (decision block 48). The indication of success/failure and completion may be transmitted from the ordering point 16 to the processor 12. For example, the lowest cache in the cache hierarchy 14 may be configured to transmit the indication. In response, the processor 12 may be configured to retire the store exclusive instruction and to mark the data memory barrier instruction as completed (block 50). If there is a branch instruction between the store exclusive instruction and the data memory barrier instruction that is mispredicted (e.g. because the branch is dependent on the store exclusive result-decision block 52, "yes" leg), the data memory barrier instruction may be flushed (block 54). The processor 12 may be configured to begin fetching at the target of the branch (e.g. the Loop label in FIG. 2, the LdExc instruction 20). Otherwise (decision block 52, "no" leg), the memory barrier instruction may be retired (block 56).

Figure 4:
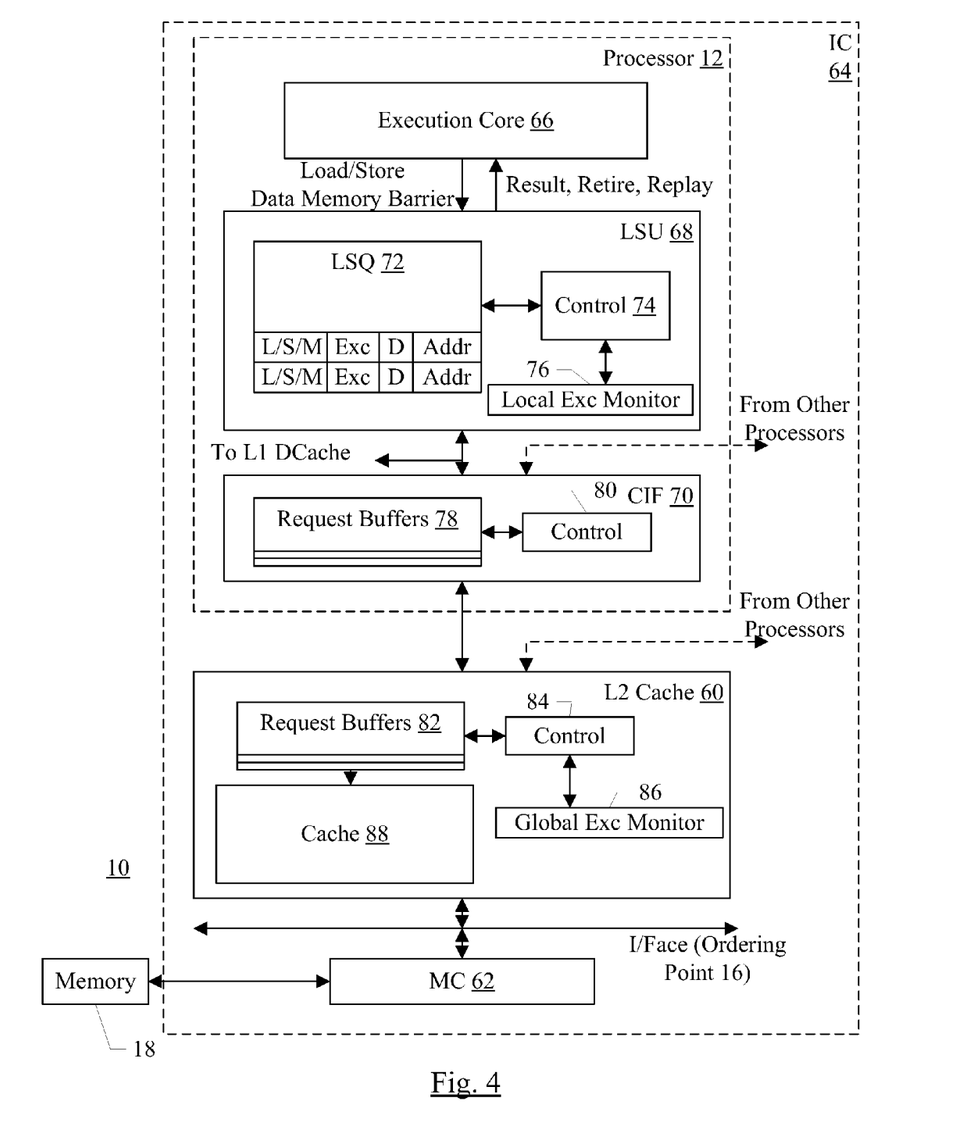
FIG. 4 is a block diagram of a more detailed embodiment of a processor, a cache hierarchy, a system ordering point, and a memory.

Turning now to FIG. 4, a block diagram of embodiment of the system 10 illustrated in more detail is shown. In the illustrated embodiment, the system 10 includes the processor 12, an L2 cache 60 (which, with the L1 DCache in the processor, may form a cache hierarchy 14), an interface (I/Face) that may be the ordering point 16, and a memory controller 62. The processor 12, the L2 cache 60, and the memory controller 62 may be integrated into an integrated circuit 64. In some embodiments, other components such as other processors and/or I/O devices/interfaces may be integrated into the integrated circuit 10 to form a system on a chip (SOC). Other embodiments may implement different levels of integration and/or discrete components, as desired. The processor 12 is coupled to the L2 cache 60, which is coupled to the memory controller 62 over the interface. Other components may be coupled to the interface as well. Accordingly, the order of operations transmitted on the interface may be the global order of operations within the system 10. The memory controller 62 may be coupled to the memory 18, which may be external to the integrated circuit 10 in this embodiment.

Some components of one embodiment of the processor 12 and one embodiment of the L2 cache 60 are illustrated in greater detail in FIG. 4. Particularly, the processor 12 includes an execution core 66, a load/store unit (LSU) 68, and a core interface (CIF) 70. The LSU 68 is coupled to the execution core 66 to receive load/store operations and data memory barrier operations, and to provide result, retire, and replay information to the execution core 66. Exception information may also be provided for various exceptions that the LSU 68 may signal. The LSU 68 is coupled to an L1 data cache (DCache) not shown in FIG. 4, and to the CIF 70. In some embodiments, the CIF 70 may be coupled to other processors as well (i.e. the CIF 70 may be a shared interface between multiple processors). In other embodiments, if other processors are included, the other processors may be coupled to the L2 cache 60 to present their accesses.

The LSU 68 may include a load/store queue 72, a control circuit 74, and a local exclusivity monitor 76. The LSQ 72 and local exclusivity monitor 76 are coupled to the control circuit 74. The CIF 70 may include one or more request buffers 78 and a control circuit 80 coupled thereto.

The CIF 70 is coupled to the L2 cache 60, which includes one or more request buffers 82, a control circuit 84, a global exclusivity monitor 86, and a cache memory 88. The request buffers 82 are coupled to the cache memory 88 and the control circuit 84, which is further coupled to the global exclusivity monitor 86.

The execution core 66 may include any circuitry configured to execute instructions. The execution core 66 may implement any microarchitecture, such as in order or out of order, superscalar and/or superpipelined, speculative or non-speculative, etc. The execution core 66 may implement a centralized scheduler with execution units (e.g. one more integer, floating point, and/or multimedia units), a distributed scheduling scheme with reservation stations, etc. The execution core 66 may employ microcoding techniques and/or may decode instructions into one or more instruction operations (ops) in addition to any of the above. The execution core 66 may also include an instruction cache from which to fetch instructions for execution.

When the execution core 66 executes load/store instructions (including LdExc and StExc instructions, respectively), the execution core 66 may be configured to generate load/store operations and may be configured to transmit them to the LSU 68. The load/store operations may include an address of the memory location affected by the load/store operation, a size (e.g. number of bytes to be accessed), data for stores, a target register identifier for loads, etc. Similarly, when the execution core 66 executes a data memory barrier instruction, the execution core 66 may be configured to generate a data memory barrier operation. The data memory barrier operation need not include an address or other information, in this embodiment, except possibly a tag to retire the data memory barrier instruction when the data memory barrier operation is complete.

The control circuit 74 may be configured to control the writing of load/store operations and data memory barrier operations into the LSQ 72. In some embodiments, the control circuit 74 may be configured to allocate entries in the LSQ 72 to store the operations as they are received. In other embodiments, particularly embodiments that may execute load/store operations out of program order, the LSQ 72 entries may be preallocated by the execution core 66 (e.g. as the operations are written to the scheduler or reservation stations, or at some other point prior to the initiation of out of order processing of instructions or ops) to maintain program order in the LSQ 72. As illustrated in FIG. 4, the LSQ 72 may include multiple entries. The entries may store various data corresponding to a memory operation or a data memory barrier operation. For example, an L/S/M field may identify an entry as corresponding to a load, a store, or a memory barrier operation. Loads and stores may be identified as exclusive operations (LdExc or StExc, respectively) via the Exc field of the entries. A done indication (D) may identify entries that are completed and ready for retirement. An address field (Addr) may store the address of the memory location accessed by a load/store operation. Other fields may store various other information (store data, target register identifier for loads and StExc operations, exception information, etc.). The LSQ 72 may be implemented as more than one memory structure in some embodiments (e.g. the address and store data information may be stored in a separate SRAM structure while the data used by the control circuit 74 may be stored in registers, flops, etc.).

The control circuit 74 may also be configured to select operations to be transmitted to the L1 DCache and/or the CIF 70. The control circuit 74 may be configured to enforce certain rules on the selection (e.g. operations to the same address may be performed in order, data memory barrier operations that are not fused with a store exclusive operation may be selected after each preceding operation in the LSQ 72 is globally visible or transmitted to the CIF 70, data memory barrier operations that are being fused with a store exclusive operation may be selected after each preceding operation in the LSQ 72 is globally visible/transmitted except the store exclusive operation with which the data memory barrier operation is to be fused, etc.).

The control circuit 74 may select a store exclusive operation to be performed, and may determine if a following memory barrier operation is in the LSQ 72. In this embodiment, the memory barrier operation may be determined to be following the store exclusive operation if it is stored in a LSQ entry adjacent to an entry assigned to the store exclusive operation. For example, in an embodiment, the store exclusive operation may occupy two entries in the LSQ 72: one entry for the store, and one entry to forward the result of the store exclusive operation (success or failure) to be written to the target register. The data memory barrier operation may be assigned to an entry that is adjacent to the entry for forwarding the result. Other embodiments may use only one entry for the store exclusive operation, and the data memory barrier operation may be determined to be following the store exclusive operation if the data memory barrier operation is in an entry adjacent to the entry. Similarly, if more than two entries are assigned to the store exclusive operation, the data memory barrier operation may be determined to be following the store exclusive operation if the data memory barrier operation is assigned to an entry adjacent to one of the entries. If a following memory barrier operation is in the LSQ 72, the control circuit 74 may speculatively fuse the store exclusive operation and the data memory barrier operation. If the following memory barrier operation is not detected, there may be no fusing. In some cases, the data memory barrier operation may not have arrived in the LSQ 72 when the store exclusive operation is selected, and no fusing may be performed.

In other embodiments, the speculative fusing of the data memory barrier operation may be performed at other points. For example, the data memory barrier operation may be detected as following the store exclusive operation in response to writing the data memory barrier operation to the LSQ 72.

The local exclusivity monitor 76 may be configured to monitor the block accessed by the load exclusive and store exclusive operations. In response to performing a load exclusive operation, the local exclusivity monitor 76 may be configured to establish a reservation for the block and may begin monitoring the block. If an invalidating probe or other operation is detected which interferes with atomic access by the processor 12 to the block, the local exclusivity monitor 76 may be configured to invalidate the reservation. It is noted that, in embodiments which implement the global exclusivity monitor 86, the local exclusivity monitor 76 may be optional (although even store exclusive operations that hit an exclusive or modified block in the L1 DCache may travel to the ordering point 16 in such embodiments). In some embodiments, the local exclusivity monitor 76 may be configured to monitor more than one block at a time.

In one embodiment, the control circuit 74 may consider the state of the local exclusivity monitor 76 in determining whether to fuse the store exclusive operation within a following data memory barrier operation. For example, if the local exclusivity monitor 76 indicates that the reservation is no longer valid, then the store exclusive operation may fail. The store exclusive operation need not be transmitted to the ordering point 16. Additionally, assuming there is a branch between the store exclusive instruction and the data memory barrier instruction (e.g. the code sequence shown in FIG. 2), the data memory barrier instruction may be flushed and thus the data memory barrier operation need not be performed. Accordingly, no fusing of the store exclusive operation and the following operation may be performed if the reservation is no longer valid.

In some embodiments, the cache state of the cache block affected by the store exclusive operation may affect the fuse determination. For example, embodiments that include the local exclusivity monitor 76 need not transmit the store exclusive operation to the L2 cache 60 if the block written by the store exclusive operation is in the L1 DCache in exclusive or modified state (i.e., in a state that makes the store globally visible when written to the L1 DCache). In some such embodiments, the store exclusive operation may be completed in the L1 DCache and fusing may not be performed. The data memory barrier operation may be transmitted to the L2 cache 60 without the store exclusive memory operation.

Memory operations that miss in the L1 DCache, or which cause coherence activity to be performed prior to completing, and data memory barrier operations may be provided to the CIF 70 and may be written to the request buffers 78. The control circuit 80 may be configured to select operations for transmission to the L2 cache 60 from the request buffers 78. Various arbitration mechanisms may be implemented to select the operation to be transmitted. For data memory barrier operations (including fused store exclusive/data memory barrier operations), the control circuit 80 may push preceding memory operations from the same processor prior to selecting the data memory barrier operation.

Operations transmitted by the CIF 70 to the L2 cache 60 may be written to the request buffers 82, and the control circuit 84 may implement any arbitration scheme to select operations to be issued to the cache memory 88 (and on the interface for global ordering and/or to the memory controller 62, as needed). For store exclusive operations, the control circuit 84 may determine success or failure responsive to the state of the global exclusivity monitor 86 once the store exclusive operation is globally ordered. The control circuit 84 may transmit a success/failure indication to the processor 12, which may update the result register of the store exclusive instruction accordingly. In one embodiment, the control circuit 80 may retain the store exclusive operation in the request buffers 78, and may capture the success/failure response from the L2 cache 60. The CIF 70 may return the result to the LSU 68, which may transmit the result to the execution core 66. Additionally, for data memory barrier operations (including fused store exclusive/data memory barrier operations), the control circuit 84 may report completion once the data memory barrier operation has pushed preceding operations in the request buffers 82 and has itself been globally ordered on the interface to the memory controller. The done indication may be propagated back through the CIF 70 to the LSU 68, which may set the done indication in the LSQ 72 entries and permit subsequent memory operations to be initiated. The LSU 68 may indicate that the store exclusive operation and the data memory barrier operation may be retired via the retire interface to the execution core 66. The result of the store exclusive operation may also be forwarded via the result interface.

Various embodiments may inhibit the initiation of memory operations that are subsequent to a data memory barrier instruction at different points. For example, the LSU 68 may inhibit subsequent memory operations in the LSQ 72, or the execution core 66 may stall further memory operation processing until the data memory barrier completes.

The global exclusivity monitor 86 may be configured to monitor blocks associated with the load exclusive/store exclusive operations, similar to the local exclusivity monitor 76. Because the local exclusivity monitor 76 and the global exclusivity monitor 86 detect various operations at different times, the two monitors may not always have the same reservation state for a block. In some embodiments, the global exclusivity monitor 86 may be configured to monitor more than one block. Particularly, the global exclusivity monitor 86 may be configured to monitor at least one block per processor that transmits requests to the L2 cache 60. Some embodiments may monitor more than one block per processor, if desired. In addition to detecting invalidating probes, the global exclusivity monitor may also detect write operations on the ordering point 16 that affect blocks being monitored. The global exclusivity monitor 86 may clear the reservation for the affected blocks.

The control circuit 84 may also be configured to generate probes for the processor 12 responsive to memory operations and/or probes received from the ordering point 16 to maintain cache coherence. In some embodiments, the control circuit 84 may filter the probes using data maintained by the control circuit 84 indicative of which blocks are stored (or not stored) in the L1 DCache. In some embodiments, the L2 cache may be inclusive of the data in the L1 DCache and thus probes that miss the L2 cache may be filtered.

The memory controller 62 may be configured to receive memory requests from the interface and to communicate with the memory 18 to read/write the identified locations. The memory controller 62 may include request buffers as well, and may implement any algorithm for selecting memory operations to perform. For reads, the memory controller 62 may return data on the interface to the requestor (e.g. the L2 cache 60).

The requests buffers 78 and 82 may be one or more structures to store requests. For example, requests from different sources and/or requests of different types (e.g. load versus store) may be stored in different structures, if desired.

Figure 5:
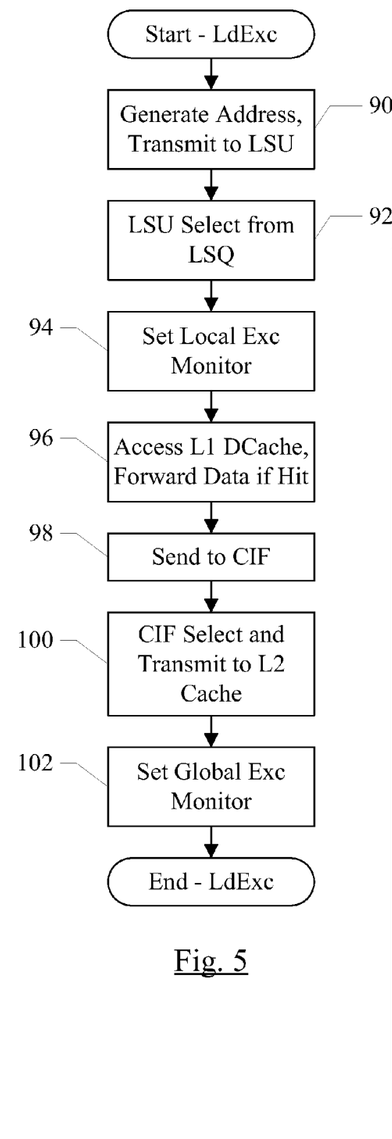
FIG. 5 is a flowchart illustrating operation of one embodiment of the components of FIG. 4 to perform a load exclusive (LdExc) operation.

Turning now to FIG. 5, a flowchart is shown illustrating operation of one embodiment of various components of the system 10 shown in FIG. 4 to perform a load exclusive operation. While the blocks are shown in a particular order for ease of understanding, other orders may be used. Blocks may be performed in parallel in combinatorial logic within the system 10. Blocks, combinations of blocks, and/or the flowchart as a whole may be pipelined over multiple clock cycles. The various components discussed below may be configured to perform the operations illustrated in FIG. 5.

The processor 12, and more particularly the execution core 66, may execute the load exclusive instruction and may generate the address for the load exclusive operation, transmitting the address and other information to the LSU 68 (block 90). The processor 12, and more particularly the LSU 12 may select the load exclusive operation from the LSQ 72 at a time that the load exclusive operation is selectable according to any ordering rules enforced by the LSU 68 (block 92). The local exclusivity monitor 76 may set a reservation for the block addressed by the address associated with the load exclusive operation (block 94) and the processor 12 may access the L1 DCache for the load exclusive operation (block 96). If the load is a hit in the L1 DCache, the LSU 68 may forward the data as the result of the load exclusive operation. In some embodiments, if the load is a hit in the L1 DCache, the load exclusive operation may be completed without further processing. In other embodiments, the load exclusive operation may only be completed if the cache block accessed by the load exclusive operation is in the exclusive state (or the modified state). In other cases, the load exclusive operation may be propagated to the L2 cache 60.

If the load exclusive operation is being propagated, the CIF 70 may receive the load exclusive operation (block 98). The load exclusive operation may be written to the request buffers 78. The CIF 70 may select the load exclusive operation and transmit the operation to the L2 cache 60 (block 100). The global exclusivity monitor 86 may establish a reservation for the addressed block, and may begin monitoring the block (block 102). If the load exclusive operation is a hit in the L2 cache 60, the L2 cache 60 may forward data for the load. Otherwise, the load exclusive operation may be forwarded to the memory controller 62 to access memory and return the data.

Figure 6:
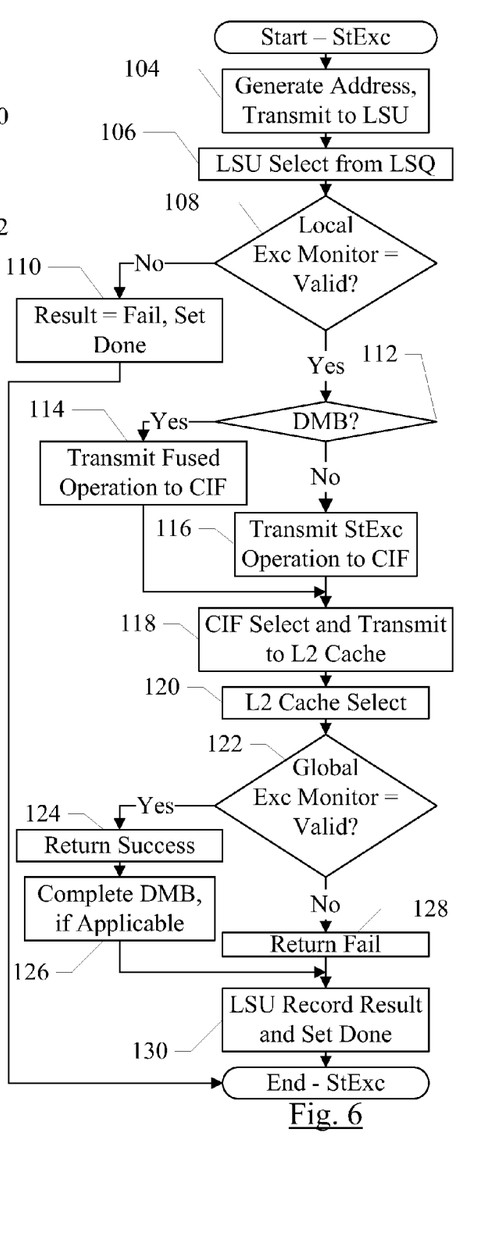
FIG. 6 is a flowchart illustrating operation of one embodiment of the components of FIG. 4 to perform a store exclusive (StExc) operation, including aspects of fused StExc/DMB operation.

Turning now to FIG. 6, a flowchart is shown illustrating operation of one embodiment of various components of the system 10 shown in FIG. 4 to perform a store exclusive operation (including fusing the store exclusive operation with a following data memory barrier operation). While the blocks are shown in a particular order for ease of understanding, other orders may be used. Blocks may be performed in parallel in combinatorial logic within the system 10. Blocks, combinations of blocks, and/or the flowchart as a whole may be pipelined over multiple clock cycles. The various components discussed below may be configured to perform the operations illustrated in FIG. 6.

The execution core 66 may execute the store exclusive instruction, and generate the address for the store exclusive operation, transmitting the address and other information to the LSU 68 (block 104). The LSU 68 may select the store exclusive operation from the LSQ 72 (block 106). If the local exclusivity monitor 76 indicates that the reservation is no longer valid for the monitored block (decision block 108, "no" leg), the result of the store exclusive may be set to fail, and the LSQ 72 may be updated to indicate that the store exclusive operation is done (block 110). The LSU 68 may forward the fail result to the execution core 66 and may indicate that the store exclusive operation may be retired once previous operations have been retired. In this case, there may be no fusing of the store exclusive with a following data memory barrier operation, if any.

On the other hand, if the local exclusivity monitor 76 indicates that the reservation is still valid (decision block 108, "yes" leg), the LSU 68 may determine if there is a data memory barrier operation assigned to an LSQ entry adjacent to an LSQ entry assigned to the store exclusive operation (decision block 112). If so (decision block 112, "yes" leg), the LSU 68 may generate the fused store exclusive/data memory barrier operation and transmit the operation to the CIF 70 (block 114). If not (decision block 112, "no" leg), the LSU 68 may transmit the store exclusive operation to the CIF 70 (block 116). The CIF may select the operation from the request buffers 78 (after pushing preceding memory operations, for the fused operation), and may transmit the operation to the L2 cache 60 (block 118). The L2 cache may select the operation from the request buffers 82 (again, after pushing the previous memory operations for the fused operation-block 120) and may access the cache memory 88 and/or transmit the store exclusive operation of the interface. If the global exclusivity monitor indicates that the reservation is still valid (decision block 122, "yes" leg), the L2 cache 68 may return an indication of success for the store exclusive operation (block 124). If the operation is the fused operation, the L2 cache 60 may also complete the data memory barrier operation (globally ordering the operation on the interface) (block 126). If the reservation is not valid (decision block 122, "no" leg), the L2 cache 68 may return a fail indication for the store exclusive operation (block 128). The LSU 68 may record the result and set the done indication for the store exclusive operation (and the data memory barrier operation, if applicable) (block 130).

Figures 7, 8:
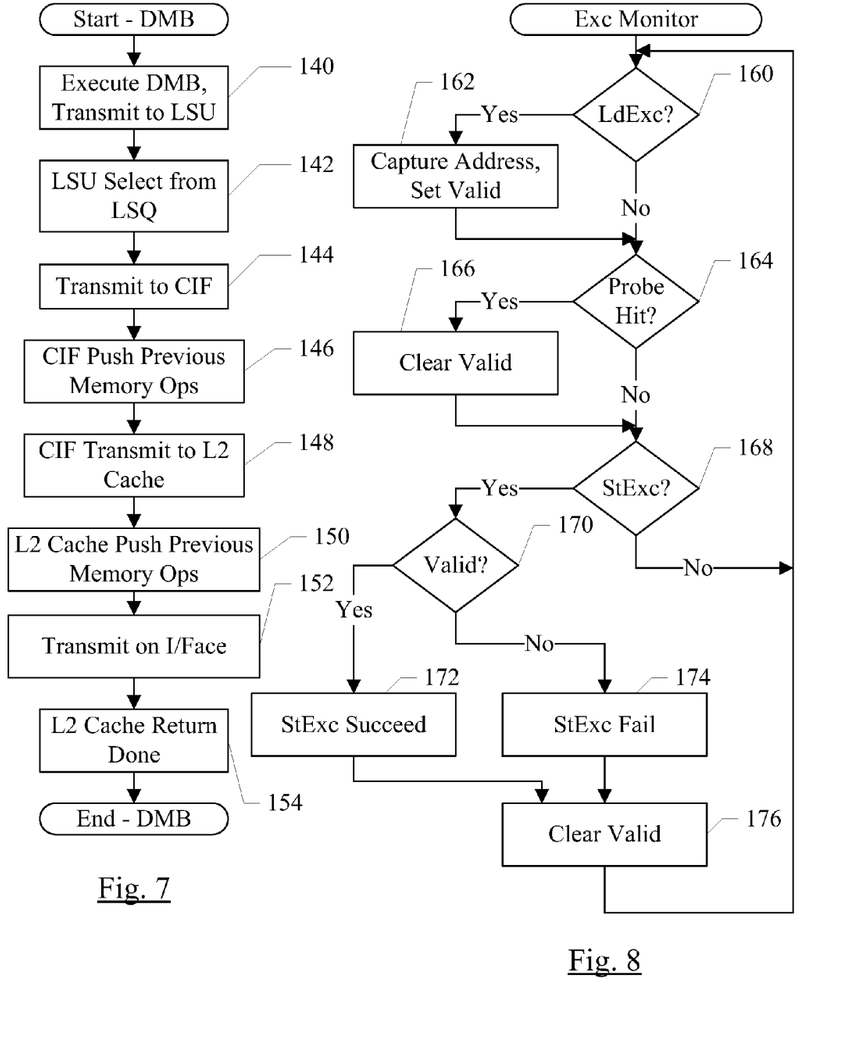
FIG. 7 is a flowchart illustrating operation of one embodiment of the components of FIG. 4 to perform a DMB operation.
FIG. 8 is a flowchart illustrating operation of one embodiment of monitoring hardware.

Turning now to FIG. 7, a flowchart is shown illustrating operation of one embodiment of various components of the system 10 shown in FIG. 4 to perform a data memory barrier operation. While the blocks are shown in a particular order for ease of understanding, other orders may be used. Blocks may be performed in parallel in combinatorial logic within the system 10. Blocks, combinations of blocks, and/or the flowchart as a whole may be pipelined over multiple clock cycles. The various components discussed below may be configured to perform the operations illustrated in FIG. 7. Additionally, as discussed above, the system 10 may perform the data memory barrier operation as illustrated in FIG. 7 as part of processing the fused store exclusive/data memory barrier operation.

The execution core 66 may execute the data memory barrier instruction, and may transmit the data memory barrier operation to the LSU 68, which may write the operation to the LSQ 72 (block 140), the LSU 68 may select the data memory barrier operation from the LSQ 72 to be performed (block 142). Particularly, the LSU 68 may select the memory barrier operation after each preceding memory operation in the LSQ 72 has been at least globally ordered in the system 10. The LSU 68 may transmit the memory barrier operation to the CIF 70, which may write the operation into the request buffers 78 (block 144). The CIF 70 may push the previous memory operations which are queued in the request buffers 78 (if any) in response to the data memory barrier operation (block 146). In some embodiments, the CIF 70 may queue operations from other processors. In such embodiments, the data memory barrier operation may push only the operations sourced from the same processor as the data memory barrier operation, if desired. The CIF 70 may transmit the data memory barrier operation to the L2 cache 60 (block 148), which may write the data memory barrier operation to the request buffers 82. The L2 cache 60 may push the previous memory operations which are queued in the request buffers 82 (if any) in response to the data memory barrier operation (block 150). In some embodiments, the request buffers 82 may queue operations from other processors. In such embodiments, the data memory barrier operation may push only the operations sourced from the same processor as the data memory barrier operation, if desired. Once the data memory barrier operation has been successfully transmitted on the interface (block 152), the L2 cache 60 may return a done indication to the processor 12. The done indication may be transmitted from the CIF to the LSQ 72, which may indicate done in the LSQ entry 72 associated with the data memory barrier operation (block 154). The LSU 68 may retire the data memory barrier operation, indicating retirement to the execution core 66.

Turning now to FIG. 8, a flowchart is shown illustrating operation of one embodiment of the local exclusivity monitor 76. While the blocks are shown in a particular order for ease of understanding, other orders may be used. Blocks may be performed in parallel in combinatorial logic within the local exclusivity monitor 76. Blocks, combinations of blocks, and/or the flowchart as a whole may be pipelined over multiple clock cycles. The local exclusivity monitor 76 may be configured to perform the operations illustrated in FIG. 8.

If the local exclusivity monitor 76 detects a load exclusive operation (decision block 160, "yes" leg), the local exclusivity monitor 76 may capture the address of the block accessed by the load exclusive operation and may establish the reservation for the address (e.g. setting a valid indication) (block 162). Thus, the local exclusivity monitor 76 may begin monitoring the block. If a probe hit is detected by the local exclusivity monitor 76 (decision block 164, "yes" leg), the local exclusivity monitor 76 may clear the valid indication (block 166), thus clearing the reservation. A probe hit may be detected if the address in the probe is in the same block (or coherence granule) as the address being monitored by the local exclusivity monitory 76. If a store exclusive operation is detected by the local exclusivity monitor 76 (decision block 168, "yes" leg) and the valid indication indicates that the reservation is still valid for the block (decision block 170, "yes" leg), the store exclusive operation may succeed (and the LSU 68 may generate a corresponding result to forward to the target register of the store exclusive operation) (block 172). If a store exclusive operation is detected by the local exclusivity monitor 76 (decision block 168, "yes" leg) and the valid indication for the block is clear (decision block 170, "no" leg), the store exclusive operation may fail (and the LSU 68 may generate a corresponding result to forward to the target register of the store exclusive operation) (block 174). In either case, the local exclusivity monitor 76 may clear the valid indication (block 176).

The global exclusivity monitor 86 may operate similar to FIG. 8, where the load exclusive operation and the store exclusive operation are also sourced by the same processor. Additionally, probes received on the ordering point 16 may be detected as illustrated, but also write operations to the block may be detected and may cause the reservation to be cleared.

Figure 9:
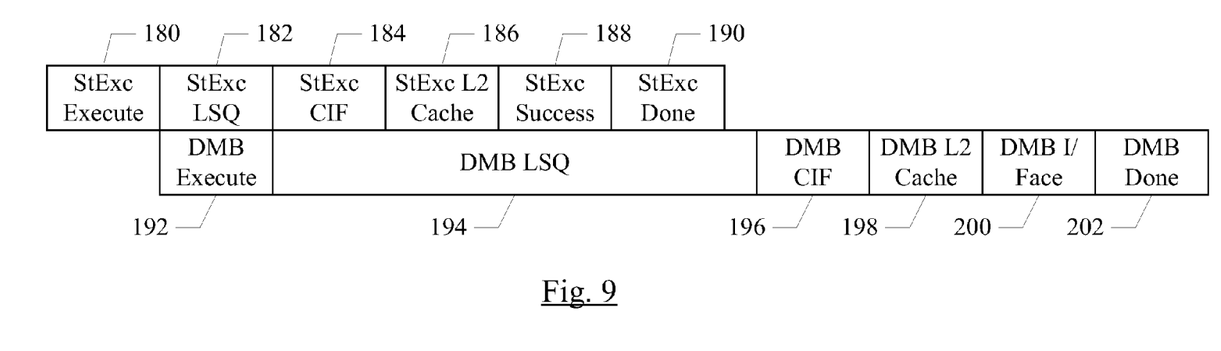
FIG. 9 is a timing diagram illustrating one example of unfused StExc and DMB operation.
Figure 10:
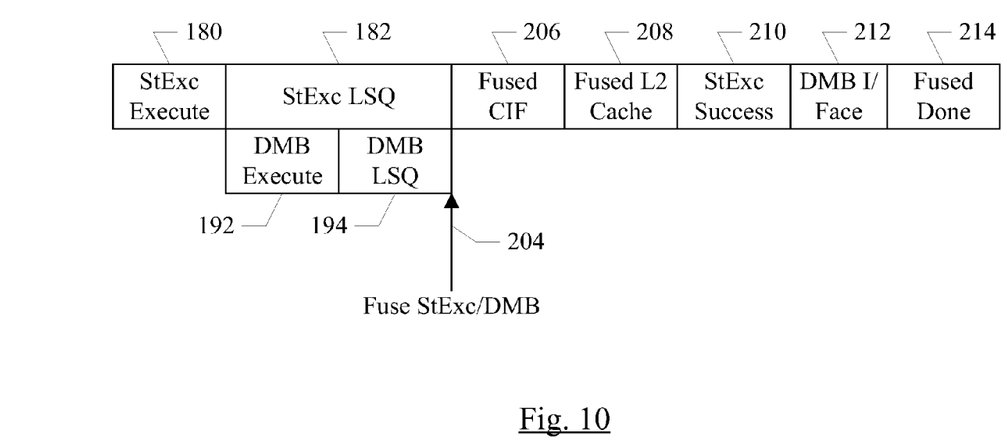
FIG. 10 is a timing diagram illustrating one example of fused StExc and DMB operation.

FIGS. 9 and 10 are timing diagrams illustrating examples of an unfused store exclusive and data memory barrier operations (FIG. 9) and a fused store exclusive/data memory barrier operation (FIG. 10). Time increases in arbitrary units to the right in FIGS. 9 and 10.

In FIG. 9, the store exclusive instruction is executed (reference numeral 180), and the store exclusive operation is written to the LSQ 72 (reference numeral 182). The store exclusive operation is transmitted to the CIF 70 (reference numeral 184), then to the L2 cache 60 (reference numeral 186). The L2 cache 60 transmits the store exclusive operation on the interface, and determines that the store exclusive is a success (reference numeral 188). The L2 cache 60 reports that the store exclusive is done (reference numeral 190).

The data memory barrier instruction may also be executed (reference numeral 192), and the LSU may write the data memory barrier operation to the LSQ 72 (reference numeral 194). In this example, the data memory barrier operation is written to the LSQ after the store exclusive operation has already been transmitted to the CIF 70, and thus there is not an opportunity to fuse the store exclusive operation with the data memory barrier operation. The data memory barrier operation remains in the LSQ 72 until the store exclusive is completed. The data memory barrier operation then proceeds to the CIF 70 (reference numeral 196), to the L2 cache 60 (reference numeral 198), and onto the interface (reference numeral 200). At each point, the data memory barrier operation pushes any preceding memory operations sourced by the same processor. In response to successful transmission on the interface, the L2 cache 60 indicates done to the LSU 68 for the data memory barrier operation (reference numeral 202). It is noted that the store exclusive operation and the data memory barrier operation may each remain in the LSQ 72, even as the operations progress down the L2 cache and onto the interface, to receive the done indication and retire the operations. Additionally, the presence of the data memory barrier operation in the LSQ 72 may inhibit the LSU 68 from initiating any subsequent memory operations until the data memory barrier operation completes.

In the example of FIG. 10, the store exclusive and data memory barrier instructions are executed and corresponding operations are written to the LSQ 72 similar to the example of FIG. 9 (reference numerals 180, 182, 192, and 194). However, in the example of FIG. 10, the store exclusive operation has not been transmitted to the CIF 70 when the data memory barrier operation is written to the LSQ 72. Accordingly, when the store exclusive operation is selected to be transmitted to the CIF 70, the memory barrier operation is fused with the store exclusive operation (arrow 204). The fused operation is transmitted to the CIF 70 (reference numeral 206) and then to the L2 cache 60 (reference numeral 208), pushing preceding memory operations sourced by the same processor due to the inclusion of the memory barrier operation. The L2 cache 60 completes the store exclusive operation successfully (reference numeral 210) and transmit the data memory barrier operation on the interface (reference numeral 212). The L2 cache 60 reports the fused operations are done (reference numeral 214). In some embodiments, the L2 cache 60 may report the store exclusive operation as done in response to the success of the store exclusive operation (reference numeral 210), without waiting for the successful transmission of the data memory barrier operation on the interface. Comparing the timing diagrams of FIGS. 9 and 10, a reduction in latency of the operations may be achieved through the fusing of the store exclusive and memory barrier operations.

Figure 11:
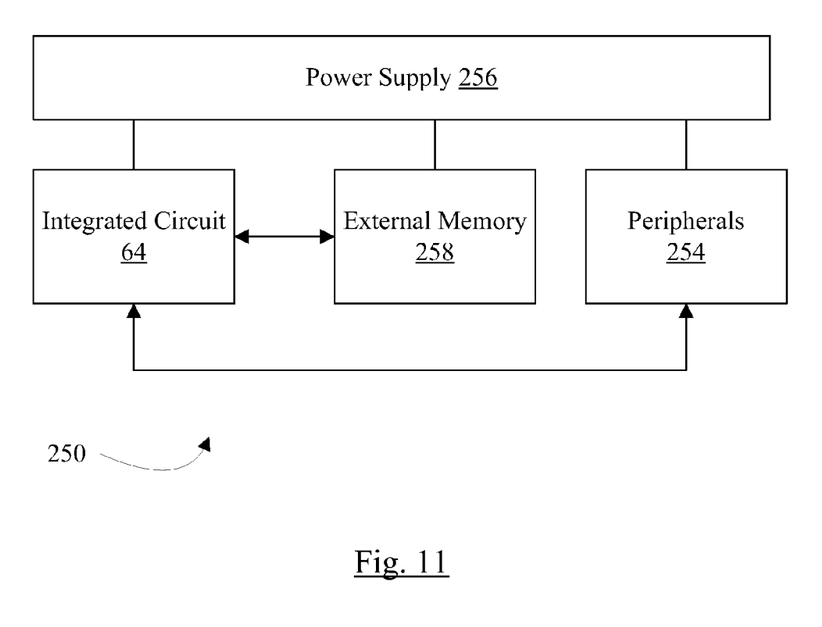
FIG. 11 is a block diagram of one embodiment of a system.

Turning next to FIG. 11, a block diagram of one embodiment of a system 250 is shown. In the illustrated embodiment, the system 250 includes at least one instance of an integrated circuit 64 (from FIG. 4) coupled to one or more peripherals 254 and an external memory 258. The external memory 258 may include the memory 18. A power supply 256 is also provided which supplies the supply voltages to the integrated circuit 64 as well as one or more supply voltages to the memory 258 and/or the peripherals 254. In some embodiments, more than one instance of the integrated circuit 64 may be included (and more than one external memory 258 may be included as well).

The peripherals 254 may include any desired circuitry, depending on the type of system 250. For example, in one embodiment, the system 250 may be a mobile device (e.g. personal digital assistant (PDA), smart phone, etc.) and the peripherals 254 may include devices for various types of wireless communication, such as wifi, Bluetooth, cellular, global positioning system, etc. The peripherals 254 may also include additional storage, including RAM storage, solid state storage, or disk storage. The peripherals 254 may include user interface devices such as a display screen, including touch display screens or multitouch display screens, keyboard or other input devices, microphones, speakers, etc. In other embodiments, the system 250 may be any type of computing system (e.g. desktop personal computer, laptop, workstation, net top etc.).

The external memory 258 may include any type of memory. For example, the external memory 258 may be SRAM, dynamic RAM (DRAM) such as synchronous DRAM (SDRAM), double data rate (DDR, DDR2, DDR3, etc.) SDRAM, RAMBUS DRAM, etc. The external memory 258 may include one or more memory modules to which the memory devices are mounted, such as single inline memory modules (SIMMs), dual inline memory modules (DIMM5), etc.

A computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A computer accessible storage medium may store instructions which, when executed on a processor 12 in the integrated circuit 64 or coupled to the integrated circuit 64, implement various operations described for the software. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A system comprising:
a processor configured to execute instructions including instructions that specify memory operations and a memory barrier instruction, wherein the processor is configured to identify a memory barrier instruction that follows a first memory operation in a speculative instruction stream, and wherein the processor is configured to issue the first memory operation and a memory barrier operation on an interface of the processor as one combined operation; and
an ordering point in the system between the processor and a system memory, wherein an order of memory operations at the ordering point establishes a global order of operations in the system, wherein the first memory operation and the memory barrier are ordered in response to the combined operation from the processor.

2. The system as recited in claim 1 further comprising one or more caches in a cache hierarchy coupled between the processor and the ordering point.

3. The system as recited in claim 2 wherein a lowest cache in the cache hierarchy is configured to order the combined operation at the ordering point and to indicate that the first memory operation and the memory barrier are ordered in response to successfully ordering the combined operation at the ordering point.

4. The system as recited in claim 3 wherein the first memory operation is a store exclusive operation, and wherein the lowest cache in the cache hierarchy is configured to determine whether or not the store exclusive is successful responsive to a state of an exclusivity monitor that is configured to monitor a block accessed by the store exclusive operation.

5. The system as recited in claim 4 wherein the exclusivity monitor is configured to initiate monitoring of the block responsive to a load exclusive operation.

6. An integrated circuit comprising:
a processor configured to execute instructions including a store exclusive instruction and a memory barrier instruction, wherein the processor is configured to detect a first store exclusive instruction and a following memory barrier instruction, and wherein the processor is configured to issue a single operation in response to the first store exclusive instruction and the following memory barrier instruction; and
a cache coupled to the processor and further coupled to an interface that is an ordering point for memory operations, wherein the cache is configured to receive the single operation and is configured to order the single operation on the interface, and wherein the cache is configured to indicate that the single operation is complete responsive to ordering the single operation on the interface.

7. The integrated circuit as recited in claim 6 further comprising a memory controller coupled to receive memory operations from the interface, wherein the memory controller is configured to couple to memory that forms a system memory of a system including the integrated circuit.

8. The integrated circuit as recited in claim 6 wherein the cache comprises a global exclusivity monitor, wherein the cache is configured to monitor a block addressed by the store exclusive instruction with respect to operations on the interface.

9. The integrated circuit as recited in claim 8 wherein the processor comprises a local exclusivity monitor, and wherein the local exclusivity monitor is configured to monitor the block with respect to probes received by the processor from the cache.

10. The integrated circuit as recited in claim 9 wherein the processor is configured not to issue the single operation if the local exclusivity monitor indicates that the store exclusive instruction will fail.

11. The integrated circuit as recited in claim 10 wherein the cache is configured to detect that the store exclusive instruction succeeds or fails responsive to the global exclusivity monitor.

12. The integrated circuit as recited in claim 6 wherein the cache comprises one or more buffers to store operations, wherein the cache is configured to order operations stored in the buffers prior to ordering the single operation.

13. The integrated circuit as recited in claim 6 wherein the processor comprises one or more buffers to store operations to be sent to the cache, wherein the processor is configured to send the operations in the buffers prior to transmitting the single operation to the cache.

14. A method comprising:
detecting a store exclusive operation in a speculative instruction stream in a processor;
detecting a data memory barrier operation subsequent to the store exclusive operation in the speculative instruction stream in the processor; and
fusing the store exclusive operation and the data memory barrier operation into a fused operation for transmission to an ordering point in a system including the processor.

15. The method as recited in claim 14 further comprising pushing preceding operations prior to the fused operation to the ordering point prior to the fused operation reaching the ordering point.

16. The method as recited in claim 14 further comprising determining a success or failure of the store exclusive operation at global ordering of the fused operation.

17. The method as recited in claim 16 further comprising returning a success/fail indication to the processor responsive to the determining.

18. The method as recited in claim 14 further comprising:
ordering the fused operation at the ordering point; and
the processor completing the store exclusive operation and the data memory barrier operation responsive to the ordering of the fused operation.

19. A processor comprising:
an execution core configured to execute a store exclusive instruction and generate a store exclusive operation, and further configured to execute a data memory barrier instruction and generate a memory barrier operation; and
a load/store unit comprising a load/store queue, where the load/store unit is coupled to receive the store exclusive operation and the memory barrier operation and is configured to write the store exclusive operation and the memory barrier operation to the load/store queue, and wherein the load/store unit is configured to detect that the memory barrier operation is adjacent to the store exclusive operation in the load/store queue and is configured to issue a combined operation in response to detecting that the memory barrier operation is adjacent to the store exclusive operation, and wherein the combined operation is defined to complete the store exclusive operation and the memory barrier operation.

20. The processor as recited in claim 19 wherein the processor further comprises an interface unit coupled to the load/store unit and configured to communicate on an interface between the processor and other components of the system, wherein the interface unit comprises one or more request buffers configured to store requests to be transmitted on the interface, and wherein the interface unit is configured to transmit all preceding requests in the request buffers prior to transmitting the combined operation.

21. The processor as recited in claim 19 wherein the load/store unit comprises an exclusivity monitor configured to monitor a block associated with the store exclusive operation, wherein the load/store unit is configured to inhibit generating the combined operation responsive to the exclusivity monitor indicating that the store exclusive operation will fail.

22. The processor as recited in claim 21 wherein the execution core is configured to execute a load exclusive instruction prior to the store exclusive instruction and to generate a load exclusive operation in response to the load exclusive instruction, and wherein the load/store unit is coupled to receive the load exclusive operation, and wherein the exclusivity monitor is configured to initiate monitoring of the block responsive to load exclusive operation.

23. A cache comprising:
a request buffer configured to store one or more memory requests;
a cache memory configured to store cache data; and
a control circuit coupled to the request buffer and configured select memory requests to access the cache, and wherein the request buffer is coupled to receive a combined store exclusive/memory barrier operation into the request buffer, and wherein the control unit is configured to globally order the memory request in the request buffer prior to globally ordering the combined store exclusive/memory barrier operation, and wherein the control circuit is configured to determine a success/fail status of the store exclusive operation responsive to globally ordering the combined store exclusive/memory barrier operation.

24. The cache as recited in claim 23 wherein the cache is coupled to an ordering point at which global order in a system including the cache is determined, wherein an operation is globally ordered responsive to successful transmission on the ordering point.

25. The cache as recited in claim 23 further comprising a global exclusivity monitor configured to monitor a block associated with the store exclusive operation, and wherein the control circuit is coupled to the global exclusivity monitor and is configured to determine the success/fail status responsive to the global exclusivity monitor.

* * * * *